Sept. 20, 1966      N. CLEAVELAND      3,273,714

CIRCULAR JIGS

Filed May 28, 1962      5 Sheets-Sheet 1

INVENTOR.
Norman Cleaveland

Sept. 20, 1966 N. CLEAVELAND 3,273,714
CIRCULAR JIGS
Filed May 28, 1962 5 Sheets-Sheet 2
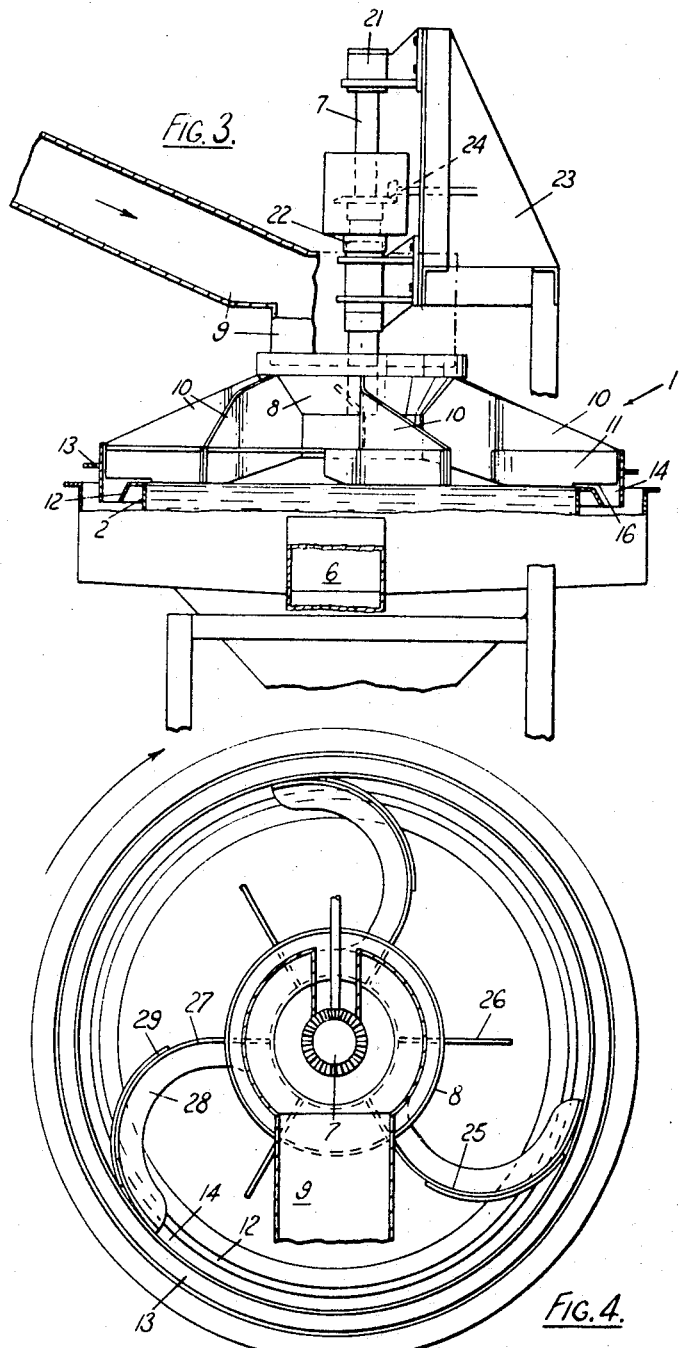
INVENTOR.
Norman Cleaveland
BY

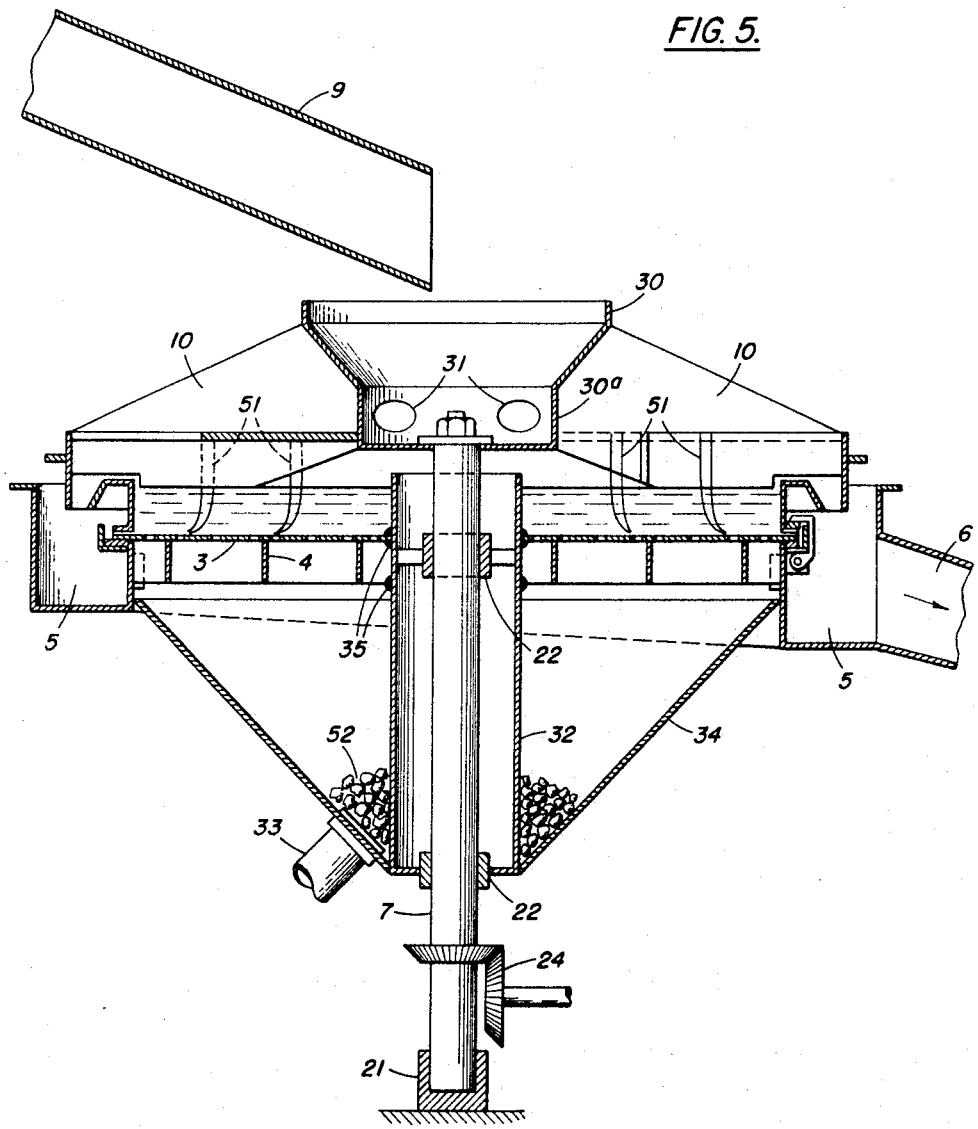

Sept. 20, 1966    N. CLEAVELAND    3,273,714
CIRCULAR JIGS

Filed May 28, 1962    5 Sheets-Sheet 4

INVENTOR.
Norman Cleaveland
BY

Sept. 20, 1966  N. CLEAVELAND  3,273,714
CIRCULAR JIGS

Filed May 28, 1962  5 Sheets-Sheet 5

INVENTOR
Norman Cleaveland
BY
Charles J. Elderkin
ATTORNEY

United States Patent Office 3,273,714
Patented Sept. 20, 1966

3,273,714
CIRCULAR JIGS
Norman Cleaveland, Kuala Lumpur, Malaya, assignor to Pacific Tin Consolidated Corporation, New York, N.Y., a corporation of Maine
Filed May 28, 1962, Ser. No. 198,289
Claims priority, application Great Britain, Sept. 8, 1961, 32,368/61
5 Claims. (Cl. 209—456)

This invention relates to mineral dressing in general, and more particularly it has to do with circular jigs used in the concentration of ores.

Basically, a jig consists of a screen which supports a bed of ore under water and is provided with means for bringing the ore bed into partial suspension at regularly recurrent intervals. While jigs may either have a movable screen or a fixed screen, the present invention is concerned primarily with the latter type. In a fixed screen jig, water is fed to the screen in a pulsating fashion so that after each pulsation the ore is allowed to settle back on the screen and after a few repetitions of the pulsation-subsidence cycle, the minerals in the bed stratify with the light mineral (tailings) on top and the heavy mineral (concentrate) at the bottom. Water pulsations are commonly produced by having a diaphragm at the bottom of the tank below the screen (called the "hutch") which is periodically flexed. This provides both a suspending upward-pulse of water and a settling suction action with each cycle of operation. Continuous operation is achieved by washing the tailings off the top and collecting the concentrate by allowing it to pass through the bed into the screen as "hutch" product. Some materials do not form a proper bed on the screen, and in this case, an artificial bed composed of iron balls or the like (called "ragging") is used.

Commonly, a jig is square or rectangular in shape and involves a cross-flow of water. Theoretically a circular jig bed, fed at the center, has a substantial advantage over a cross-flow jig. This advantage is due to the fact that as the feed flows out radially from the center to the periphery of the circular bed, the rate of flow is rapidly decelerated, a condition which facilitates the concentration and settling of particles with the higher specific gravities. Heretofore, this theoretical advantage of the circular jig has been largely nullified by the fact that water has been used to transport the jig feed over the bed. Thus, the volume and velocity of water in the feed must be sufficient to carry the lighter material over the discharge lip at the periphery of the bed. Therefore, there must be a substantial surplus of water with much higher velocities than necessary on the interior portion of the jig bed. This rapidly moving surplus water tends to interfere with the desired concentration and largely nullifies the advantage gained by the deceleration mentioned above. Also this surplus water tends to form channels across the jig bed rather than to flow uniformly to the discharge lip at the periphery. These channels disrupt the effectiveness of the jigging action by causing variations in the thickness of the jig bed. Variations in jig bed thickness result in over-agitation of the thinner sections and under-agitation of the thicker. Maintaining a uniform thickness of jig bed is particularly difficult with a circular jig mounted on a placer mining dredge, because the jigs are normally subjected to wide fluctuation in the volume and density of the feed.

Furthermore, since the bow of a dredge hull rises and the stern sinks about the center of buoyancy as a dredge ladder is lowered to increase digging depth, machinery on the deck is seldom level. Thus the feed or pulp delivered to a circular jig will discharge mainly from the low side of the jig bed. Also the depth of bed will be greater on the low side and will therefore offer more resistance to the jigging impulses which will then find release in the high, shallower side of the jig bed. Consequently, the high side of the bed will be over-agitated whereas the low side will not be sufficiently agitated and the efficiency of the jig will be impaired. For the above reasons the use of circular jigs on placer mining dredges has not proved practicable.

According to the present invention there is provided a jig for mineral dressing including a circular jig bed basket means for delivering the feed onto the center of the bed, and skimming means mounted for rotation around said delivery means and above said basket, said skimming means being adapted in operation of the jig to skim the surface of the jig bed so as to tend to distribute the feed, particularly the part of lighter specific gravity, evenly over the surface of the bed, and if desired, to accelerate the discharge of lighter fractions over the edge of the jig, thereby increasing its capacity.

In operation of a circular jig, feed delivered to the center of the bed flows outwardly and the bulk is discharged over the discharge rim or lip of the basket. The skimming means provided according to the present invention tends to maintain an even distribution of the feed over the bed and hence an even overflow around the entire discharge rim or lip in spite of variations in the level of the jig bed. Also, by distributing the feed evenly and thus controlling the overflow, the efficiency of the jig is increased above that for an unskimmed jig when subjected to fluctuations in the volume and density of the feed.

The skimming means can act over substantially all of the surface of the jig bed, i.e. all except the center position into which the feed is delivered, or alternatively can act only over an annular portion, preferably the radially outer portion, of the bed.

Preferably, means are provided defining a discharge channel surrounding the jig basket through which the overflow of material passes to the discharge chute and which is suitably dimensioned to throttle the discharge of material at the periphery of the basket so that a disproportionate overflow at any one place on the periphery cannot take place before the skimming means has an opportunity to distribute the material around the basket.

The action of the skimming means may be such as either to accelerate or to retard the outward flow of the feed according to different conditions of use. It may also be desirable in some circumstances to have an arrangement in which the skimming means accelerates the outward flow over a radially inner part of the jig bed whilst retarding it over the radially outer part. When in a form accelerating outward flow of the feed the effect of the skimming means is to increase the capacity of the jig substantially, and reduce to a minimum the amount of water required in the feed.

The skimming means may be shaped to contour the skimmed surface area of the bed to a required shape, for example, to maintain a uniform bed depth over the skimmed area despite a slightly concave or convex jig screen, the skimming blades having shaped edges, either convex or concave to contour the bed to a convex or concave shape and preferably skimming substantially the whole of the bed. The jig screen may thus be made slightly convex or concave respectively to assist in hastening the discharge of or retaining particles of high specific gravity.

The skimming means may be supported by a rotary member mounted above the center of the jig bed basket. Such a rotary member preferably takes the form of a rotary feed chute for delivering the feed into the center of the jig bed. Alternatively, the skimming means can be supported at the periphery of the basket, for example, on support means adapted to run around a support rail or track disposed concentrically with respect to the jig bed basket. On jigs of large diameter it may be desirable to drive the skimmer blades from a support ring provided to extend therearound, which support ring can be adapted to serve as the said means for defining a discharge channel around the jig basket. Such a drive would require less headroom for the jig installation.

Preferably the skimming means comprises a plurality of skimming blades. These can conveniently be mounted on rotor arms supported at their inner ends by the aforesaid rotary member. In a preferred construction, six equispaced rotor arms are provided, each mounting a single blade which overlies the radially outer part of the jig bed and extends beyond the rim of the jig basket. These blades are swept back, i.e. angled rearwardly to the radius in the direction of rotation, so as to accelerate the outward flow of lighter material as they skim the bed. If desired, more or less than six arms may be provided and each may mount several smaller blades instead of a single blade. Moreover, for certain purposes the skimming blades may be angled forwardly instead of rearwardly to retard the outward flow of material.

The skimming blades can be detachably and/or adjustably mounted for ease of interchanging or for changing the attitude of the blades accordingly as it is required that they should hasten or retard the outward flow of material.

The bottom edges of the aforesaid skimming blades may be shaped to contour the jig bed surface to produce an even thickness of bed over the skimmed area thereof even though a slightly concave or convex jig screen is employed for the purposes mentioned above.

If a rotary feed chute is provided, it will normally be fed from a fixed chute. Preferably the rotary feed chute will be provided with means to assist the flow of the feed through it and distribute it evenly onto the bed. Such means can take the form of angled blades disposed within the chute, or helical flights, ribs or the like projecting inwardly from the side wall of the chute to provide a spiral flow of the feed onto the bed.

The jig bed can be kept "alive" by temporarily attaching rods to the skimming means to project down into the jig bed and stir it up as the skimming means rotates. It is also possible to attach means such as a scoop or a plough onto the skimming device to facilitate the removal of heavy oversize material from the jig screen and to further increase the capacity of the jig.

An alternative method of keeping the bed alive is through the use of a pulsator mechanism for controlling water in the hutch. In this embodiment, water pressure in the incoming flow builds up and opens a spring controlled valve sending a pulse of water up through the screen, thus momentarily suspending ore in the bed. The rate of pulsation can be varied generally between 400 and 600 pulses per minute. However, for operation on a dredge, the rakes, scoops or plows described hereinabove are generally preferred.

An alternative embodiment of the invention involves driving the skimmer blades from a shaft located in a sleeve coming up from underneath the screen and the bed. This embodiment, along with the edge driving embodiment mentioned above, has the advantage of requiring much less head room which is important in certain applications.

A still further embodiment of the invention involves mounting of the skimmer blades in a rigid position over the bed and rotating the bed itself. In this embodiment the feed coming from the chute can be conveniently deposited on the cone-shaped member in the center of the bed which, when rotating, will distribute the ore evenly to the inner portions of the bed. This embodiment has the advantage of being able to treat a wide variety of ores in that by controlling the speed of rotation, one has direct control over the centrifugal forces acting on the ore, and hence on the degree of concentration to be achieved.

In order that the invention may be more fully understood, several preferred embodiments thereof will now be described by way of example only with reference to the accompanying drawings in which:

FIG. 3 is a partial side elevation viewed from the right of FIG. 1;

FIG. 4 is a plan view of a second embodiment of the invention;

FIG. 5 is a sectional elevation equivalent to FIG. 2, but showing a bottom driven skimmer mechanism;

Figure 1:
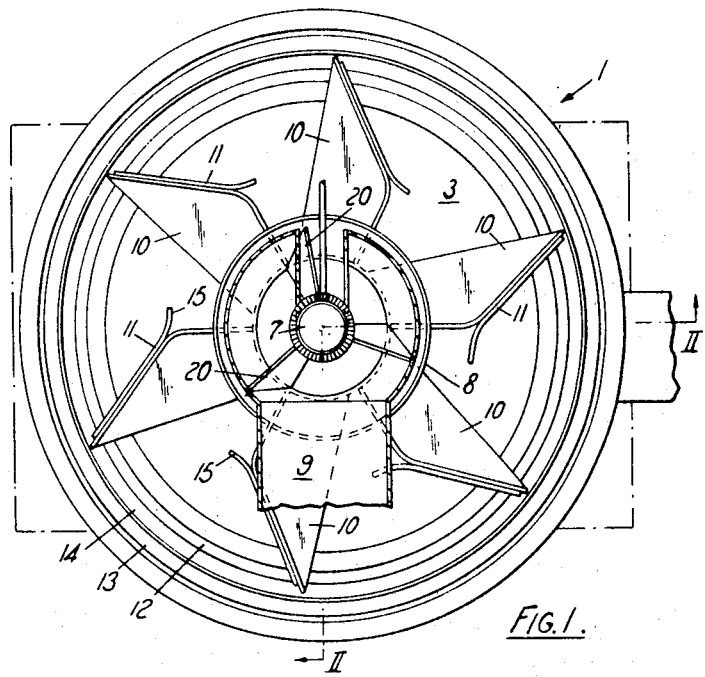
FIG. 1 is a plan view of a first embodiment of the invention with supporting framework omitted for greater clarity.
Figure 2:
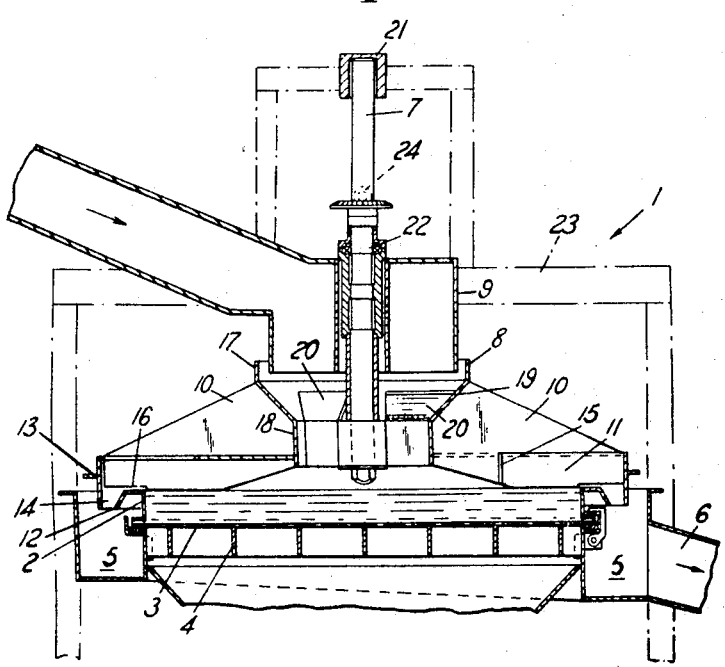
FIG. 2 is a partial sectional elevation on the line II—II of FIG. 1.

The following detailed description of the various embodiments of the invention necessarily emphasizes the skimming blade structure thereof, but it will be understood that the invention is designed for use in conjunction with conventional circular jigging apparatus having appropriate water pulsating means.

The first embodiment comprises a circular jig 1 having a circular jig bed basket 2, the base of which is constituted by a flat, circular screen 3 supported on a grid 4. Surrounding the basket 2 to receive the overflow therefrom is an overflow chute 5 having a discharge chute 6 leading to a pond. A driven rotor shaft 7 carrying at its lower end a rotary feed chute 8 is mounted vertically over the center of the circular jig bed basket 2. A stationary feed chute 9 is provided for delivering the feed into said rotary feed chute 8. Six equi-spaced rotor arms 10 are carried by the said rotary feed chute 8 and each arm 10 detachably mounts a substantially straight skimming blade 11 which overlies the radially outer part of the jig bed and extends beyond the lip or rim 12 of the basket. The blades 11 are swept back, i.e. they are inclined rearwardly with respect to the direction of rotation at an angle of about 45°. The outer ends of the arms 10 are interconnected for support by a support ring 13 which encircles the jig bed basket 2. This circular support ring 13 defines a discharge channel 14 between it and the rim 12 of the jig bed basket 2 to direct the overall flow from the basket 2 into the overflow chute 5. By making this discharge channel 14 of suitable dimensions it throttles the flow of material over the discharge lip 12 so that the skimming blades 11 can carry surplus material around to less congested parts of the periphery of the bed.

Although the blades 11 are substantially straight the inner ends 15 are slightly outwardly turned. The bottom edge of each blade 11 is upwardly stepped at the outer end 16 of the blade to provide a clearance between the blade 11 and the rim 12 of the basket 2, whilst the inner part of each blade 11 overlying the jig bed basket 2 is level with the rim 12.

The rotary feed chute 8 is circular in horizontal cross section, having a large diameter upper cylindrical part 17 and a smaller diameter cylindrical lower part 18 interconnected by a conical portion 19. Mounted on the inner wall of the conical portion 19 of the rotary feed chute 8 are three equi-spaced auger feed distributing blades 20. These feed distributing blades 20 are continued vertically downwards into the cylindrical lower part 18 and constitute, together with the rotary feed chute 8, a spiral feeder for delivering the feed onto the center of the jig bed.

The rotor shaft 7 of the jig 1 is supported in bearings 21 and 22 in a framework 23 and driven through gears 24 as shown in FIGURE 3.

In operation of the jig, feed is delivered to the rotary feed chute 8 through the fixed chute 9 and is evenly distributed by the auger feed blades 20 onto the center of the bed.

The skimming blades 11 are rotated at between 1 and 5 r.p.m. and in skimming the surface of the bed to distribute the jig feed evenly over the bed regardless of fluctuation in feed or variation of bed level, whilst at the same time hastening the outward flow discharge of materials of lighter specific gravity.

The blades 11 also maintain the skimmed surface of the bed flat and thus of even depth.

In the second embodiment illustrated in FIG. 4, the construction is identical with the first embodiment except in the shape of the blades. The auger feed distributing blades 20 have been omitted from Fig. 4 in the interest of clarity.

Thus, six equiangularly spaced arms 25 and 26 are carried by the rotary feed chute 8. These comprise three short arms 26 and three long arms 25 alternately arranged.

The short arms 26 are straight and the long arms swept back in a curve of substantially constant radius to touch the support ring 13 at their outer ends where they are welded to the ring 13. Each of the long arms comprises a curved vertical part 27, and a similarly curved horizontal part 28 attached behind the vertical part 27, on the inside of the curve, for the purpose of stiffening the arm 25. The vertical part 27 of each long arm tapers slightly in height away from the feed chute 8 and has a horizontal lower edge. A blade 29 with the same curvature as the vertical part 27 is bolted thereto and its horizontal lower edge extends below the lower edge of the vertical part 27 to skim the jig bed 3. By bolting through holes in the part 27 and vertical slots in the blade 29, the latter is made adjustable to permit a measure of control over the depth of the jig bed 3 and to permit adjustment to allow for the wear of the blade 29.

The short arms 26 are in the form of a straight or shaped vertical member tapering in height away from the feed chute 8, the horizontal lower edge of which skims the surface of the jig bed 3 over its whole length.

The operation of the jig is the same as in the first embodiment except that greater radial acceleration is imparted to the feed adjacent the periphery of the bed.

A bottom driven embodiment of the invention is illustrated in FIG. 5. In this embodiment the chute 9 for feeding in ore simply terminates above rotating hopper 30. Upon feeding of the ore from chute 9, it falls into the lower portion of the hopper 30a and is distributed onto the bed by means of orifices 31 or any other suitable means. The skimmer blades are constructed as heretofore described, but as can be seen, the drive shaft 7 comes up from the bottom of the unit and is located within sleeve 32. The shaft is supported by bearings 21 and 22 and driven through gears 24. It will be noted that the lower portion of the hopper 30a has a wider diameter than sleeve 32, so it will be impossible for ore to enter sleeve 32. In any event this will be unlikely due to the centrifugal forces throwing the ore out onto the bed from ports 31. An exit pipe 33 provided at the bottom of the hutch 34 where concentrate 52 falling through the screen 3 can be continuously or periodically withdrawn. A valve (not shown) will generally be provided on this pipe. Removable rakes 51 are here provided for activating the bed and, consequently, no diaphragm or other means of suspending the solids on the screen is required.

Figure 6:
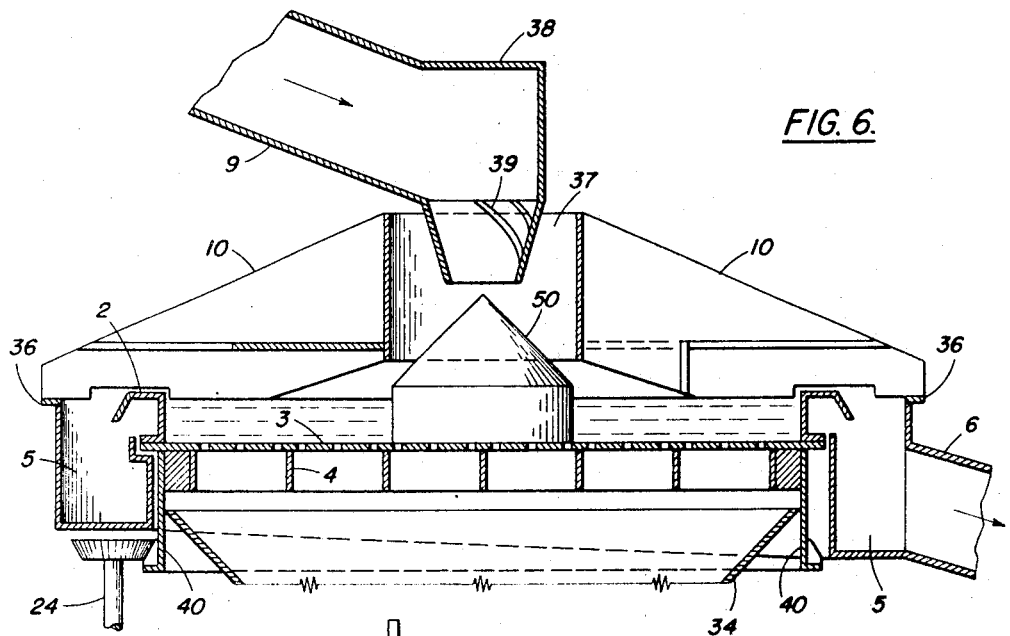
FIG. 6 is a partial sectional elevation equivalent to FIG. 2 showing stationary skimmer blades and a rotating bed.

An embodiment of the invention in which the bed rotates and the skimmer blades remain stationary is shown in FIGURE 6. In this embodiment, the chute 9 terminates at end structure 38 having helical grooves 39 or a like device so that the ore coming down the chute will be evenly distributed over the cone-shaped member 50. End structure 38 can conveniently be opened at the top so that any jams that do occur can be remedied with a bar. The skimmer blades 10 are rigidly attached at 36 and are supported in the center by annular member 37. The screen 3 and supporting grid 4, in addition to having the cone-shaped member 50 mounted thereon, are provided with geared flange 40 which is operably connected to the driving gears 24. Other arrangements for driving the bed in a circular manner will be obvious to one skilled in the art. Suitable means (not shown) can be used to support the bed in a rotatable manner.

It will be noted that the embodiments shown in FIGS. 5 and 6 both have the advantage of requiring little head room. A further alternative having the same advantage involves using rim 13 (FIG. 1) as a drive-ring to rotate the skimmer blades with a drive arrangement similar to that shown in FIG. 6. As mentioned heretofore, the bed can be activated by attaching rakes or scoops 51 (FIG. 5) to the blades 10 and this will provide suitable agitation to effect gravity separation of the heavy minerals while the tailings overflow out of the device. In this embodiment, or for that matter, with any other means of bed activation, the deceleration of the water as it flows outwardly provides a suitable settling effect and the combination of both results in an excellent separation.

Figure 7:
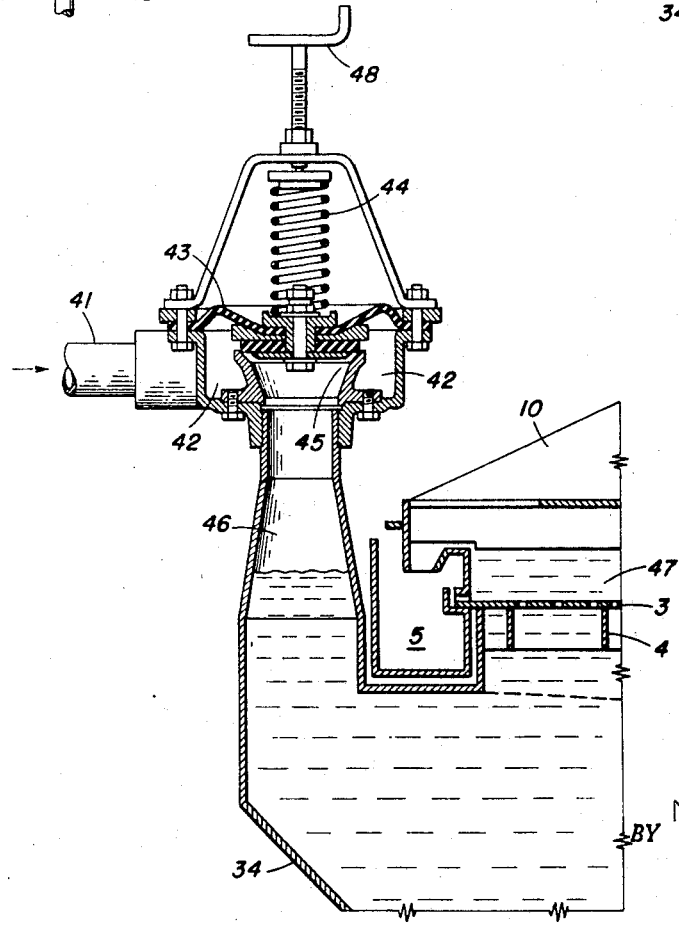
FIG. 7 is a partial sectional elevation showing a typical mechanism for utilizing water pulsation to keep the bed alive.

An alternative embodiment for actuating any of the beds illustrated in FIGS. 1–6 is shown in FIG. 7. In this embodiment water at a reasonable pressure is maintained in entrance pipe 41 and annular chamber 42. At full line pressure the water coacts with diaphragm 43 which is maintained by spring 44 so that the valve seat 45 is raised allowing a pulse of water to descend from chamber 42 through pipe 46 and into the hutch 34. This raises the level of the water in the hutch above the screen 3 and momentarily suspends the material in the bed 47. As soon as the pressure in the line 41 and the annular chamber 42 is reduced, spring 44 pushes the valve 45 back in its seat and the cycle starts again. The rate of pulsation is controlled by handle 48 which can vary the tension on the spring 44. Generally, 400 to 600 pulses per minute is found to be satisfactory. It will be noted that this type of pulsator does not provide the suction action of a diaphragm-type activator, but a settling effect is achieved by the deceleration of water and ore as they spread outwardly over the jig, and the combination of activation and deceleration has been found to be very advantageous.

Figure 8:
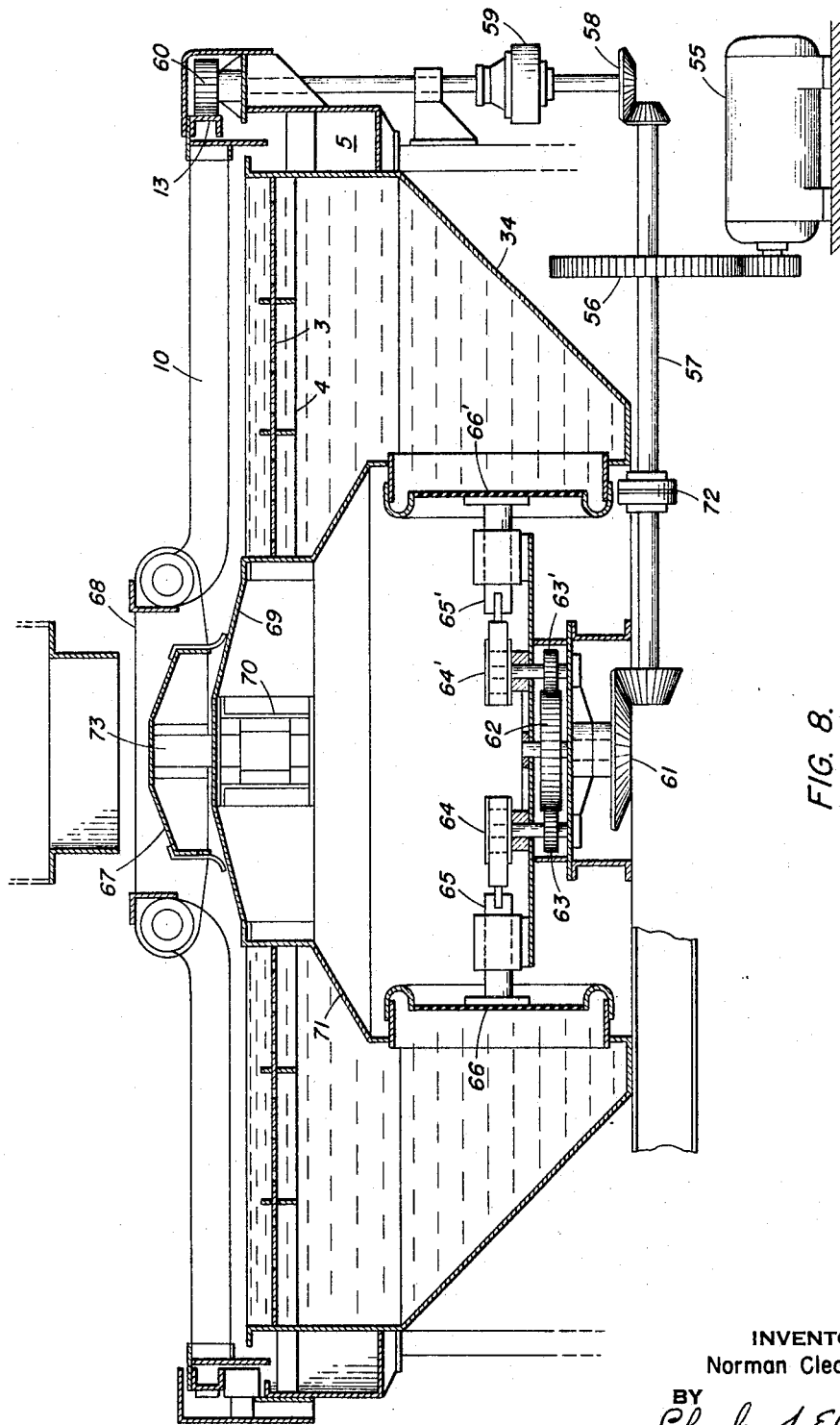
FIG. 8 is a sectional elevation showing a single drive means operating the skimming blades and the pulsating mechanism.

FIGURE 8 shows an embodiment wherein a single motor is used to drive both the skimming blades and a plurality of diaphragms which pulsate the water in the hutch. In the drawing, which has been simplified by elimination of supporting structure, the motor 55 is connected through gears 56 to drive shaft 57. Pinion and bevel gears 58 transfer the power to a two-disc clutch 59, which allows separate control of the skimming blades while the jig is operating. Gear 60 engages the circular ring 13 for rotation of the skimming blades.

In the embodiment illustrated, it is convenient to divide the hutch into six separate compartments by means of dividing plates (not shown), although a larger or smaller number may be used. Each compartment is provided with its own pulsator, actuated as described hereinbelow. Drive shaft 57 is connected through flexible coupling 72 to bevel gears 61, which in turn drives gear 62. It is necessary that the common shaft connecting gears 61 and 62 be located at the center of the circular opening in the bottom of the hutch, the opening structure being indicated generally at 71. Surrounding gear 62 and in engagement therewith are a plurality of gears 63, 63' which drive eccentrics 64, 64'. The number of such gears 63 and eccentrics 64 is equal to the number of compartments and, hence, the number of pulsators. Shafts 65, 65', ride on the eccentrics, and with each rotation thereof act to flex the diaphragms 66, 66' which are mounted in the sidewalls of structure 71. The stroke of each diaphragm need only be of the order of two or three inches to provide a sufficient pulsation for an average installation. When six compartments and pulsators are involved, the drive of the eccentrics can be balanced by having them timed at intervals of 60°.

FIGURE 8 shows in section the general type of skimming arm illustrated in FIGURE 4. In will be noted that structure 71 has an upper portion 69, within which shaft 73, mounted in tapered bearing 70, supports the skimming blade and support 10 through member 68. Cone-shaped member 67 is also attached to shaft 73 and rotates therewith so that material falling from the feed chute (not shown) will be evenly distributed over the inner portions of the jigbed. To supply water to the hutch in this embodiment, pipes (not shown) can conveniently be run up through the interior of structure 71, one pipe to a compartment being used, these can discharge into the hutch through holes provided in the vertical sections of upper structure 69.

It is to be emphasized that the foregoing embodiments are intended to be illustrative only and are in no sense to be construed as limiting the scope of the invention as defined in the claims appended hereto.

Having thus described my invention, what it is desired to secure by Letters Patent is:

1. A jig for mineral dressing comprising:
   a circular jig bed basket;
   means for pulsating water through said basket;
   means for delivering a feed of solid particles onto the central portion of said basket whereby a bed of solid particles is established on said basket; and
   skimming means rotatably mounted around said delivery means above said basket, said skimming means comprising arm means extending substantially from said delivery means to the periphery of said basket, and blade means attached to said arm means, the lower edge of said blade means extending at least to the top of said basket and being shaped to contour the major portion of the surface area of the bed between said delivery means and the periphery of said basket and maintain a uniform bed depth by distributing feed evenly over the contoured surface of said bed basket.

2. The jig as claimed in claim 1, wherein said blade means are angled rearwardly to the radius in the direction of rotation so as in use to accelerate the outward flow of the feed along a spiral path.

3. A jig as claimed in claim 1, wherein said skimming means have bed-activating means attached thereto.

4. A jig as claimed in claim 1 wherein the skimming means are supported by a rotary feed chute for delivering the feed onto the center of the jig bed basket.

5. A jig as claimed in claim 1, and additionally comprising a support ring encircling the jig bed basket, said ring being connected to said arm means for rotation therewith.

References Cited by the Examiner

UNITED STATES PATENTS

| | | | |
|---|---|---|---|
| 279,641 | 6/1883 | Dodge | 209—455 |
| 452,393 | 5/1891 | Scovell | 209—455 |
| 705,104 | 7/1902 | Longan | 209—453 |
| 998,163 | 7/1911 | Dodds | 209—453 |
| 1,319,790 | 10/1919 | Park | 209—455 |
| 1,719,971 | 7/1929 | Fahland | 241—171 |
| 2,987,185 | 6/1961 | Feeney | 210—528 X |

FOREIGN PATENTS

| | | |
|---|---|---|
| 534,823 | 3/1941 | Great Britain. |

FRANK W. LUTTER, *Primary Examiner.*